(12) United States Patent
Togashi

(10) Patent No.: US 10,768,750 B2
(45) Date of Patent: Sep. 8, 2020

(54) INPUT DEVICE

(71) Applicant: SHARP KABUSHIKI KAISHA, Sakai, Osaka (JP)

(72) Inventor: Yasuyuki Togashi, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/424,894

(22) Filed: May 29, 2019

(65) Prior Publication Data

US 2019/0384479 A1  Dec. 19, 2019

Related U.S. Application Data

(60) Provisional application No. 62/683,637, filed on Jun. 12, 2018.

(51) Int. Cl.
*G06F 3/041* (2006.01)
*G06F 3/044* (2006.01)

(52) U.S. Cl.
CPC ........ *G06F 3/04186* (2019.05); *G06F 3/0446* (2019.05); *G06F 2203/04105* (2013.01)

(58) Field of Classification Search
CPC ......... G06F 3/03547; G06F 3/041–047; G06F 2203/04105
See application file for complete search history.

(56) References Cited

U.S. PATENT DOCUMENTS

2010/0123677 A1* 5/2010 Brown ................. G06F 3/0418
345/174

FOREIGN PATENT DOCUMENTS

JP  2012-118575 A  6/2012

* cited by examiner

*Primary Examiner* — Michael Pervan
(74) *Attorney, Agent, or Firm* — ScienBiziP, P.C.

(57) ABSTRACT

An input device includes an input accepting member, a base, a first pressure sensor, a weight, a second pressure sensor, and a processor. The input accepting member accepts a pressing operation. The input accepting member is attached to the base. The first pressure sensor on the base is configured to detect a pressure acting thereon by the input accepting member. The second pressure sensor on the base is configured to detect a pressure acting thereon by the weight. The processor is configured to: multiply an output value from the second pressure sensor by a ratio of mass of the input accepting member to that of the weight to obtain a correction value; and correct an output value from the first pressure sensor by using a correction value to extract an output value that relates to a pressing force applied to the input accepting member by the pressing operation.

12 Claims, 13 Drawing Sheets

INPUT DEVICE

CROSS REFERENCE TO RELATED APPLICATION

This application claims priority from U.S. Provisional Application No. 62/683,637 filed on Jun. 12, 2018. The entire contents of the priority application are incorporated herein by reference.

TECHNICAL FIELD

The technology described herein relates to an input device.

BACKGROUND

One example of a known input device including a touch panel is described in Japanese Patent Application Publication No. 2012-118575 below. In the input device, an accelerometer detects quantity of vibration applied to the input device. If the quantity detected in a predetermined time period, which includes when the operating state of the touch panel or the press button changed, exceeds a predetermined value, the controller cancels the change in the operating state of the touch panel or the press button and maintains the initial operation state.

An object of the input device is to prevent an unintentional operation caused by an incorrect pressing operation resulting from vibration or impact. Thus, when the quantity of vibration applied to the input device while being subjected to vibration or impact, for example, is smaller than a predetermined value, the pressure applied by the pressing operation of the user is detectable. However, the detected pressure is affected by the quantity of vibration to some degree. The detection of the pressing operation may be improper.

SUMMARY

The technology described herein was made in view of the above circumstance. An object is to properly detect the pressing operation.

An input device includes an input accepting member that accepts a pressing operation, a base to which the input accepting member is attached, a first pressure sensor disposed on the base and configured to detect a pressure acting thereon by the input accepting member, a weight, a second pressure sensor disposed on the base and configured to detect a pressure acting thereon by the weight, and a processor configured to correct an output value from the first pressure sensor by using a correction value obtained by multiplying an output value from the second output sensor by at least a ratio of mass of the input accepting member to that of the weight to extract an output value relating to a pressing force applied to the input accepting member by the pressing operation.

In this configuration, when the input accepting member accepts the pressing operation, the first pressure sensor detects the pressure acting on the input accepting member. At this time, when no inertial force acts on the input device, the second pressure sensor does not detect a pressure because no inertial force acts on the input accepting member and the weight. In such a case, the output value from the second pressure sensor is zero, and the correction value is zero. Thus, the processor extracts the output value from the first pressure sensor as the output value relating to the pressing force applied to the input accepting member by the pressing operation. In contrast, when an inertial force acts on the input device, the first pressure sensor detects the pressure including the pressure caused by the inertial force and the pressure caused by the pressing operation and the second pressure sensor detects the pressure caused by the inertial force, because the inertial force acts on each of the input accepting member and the weight. At this time, the processor calculates the correction value by multiplying the output value from the second pressure sensor by at least the ratio of the mass of the input accepting member to that of the weight. The correction value corresponds to an amount of change in pressure acting on the first pressure sensor, which changes with an inertial force acting on the input accepting member. The processor corrects the output value from the first pressure sensor by using the correction value to extract the output value relating to the pressing force applied to the input accepting member by the pressing operation. This processing performed by the coprocessor eliminates a change in pressure acting on the first pressure sensor, which is caused by an inertial force acting on the input accepting member, enabling proper detection of the pressing operation.

According to the technology described herein, the pressing operation is properly detected.

DETAILED DESCRIPTION

First Embodiment

Figure 4:
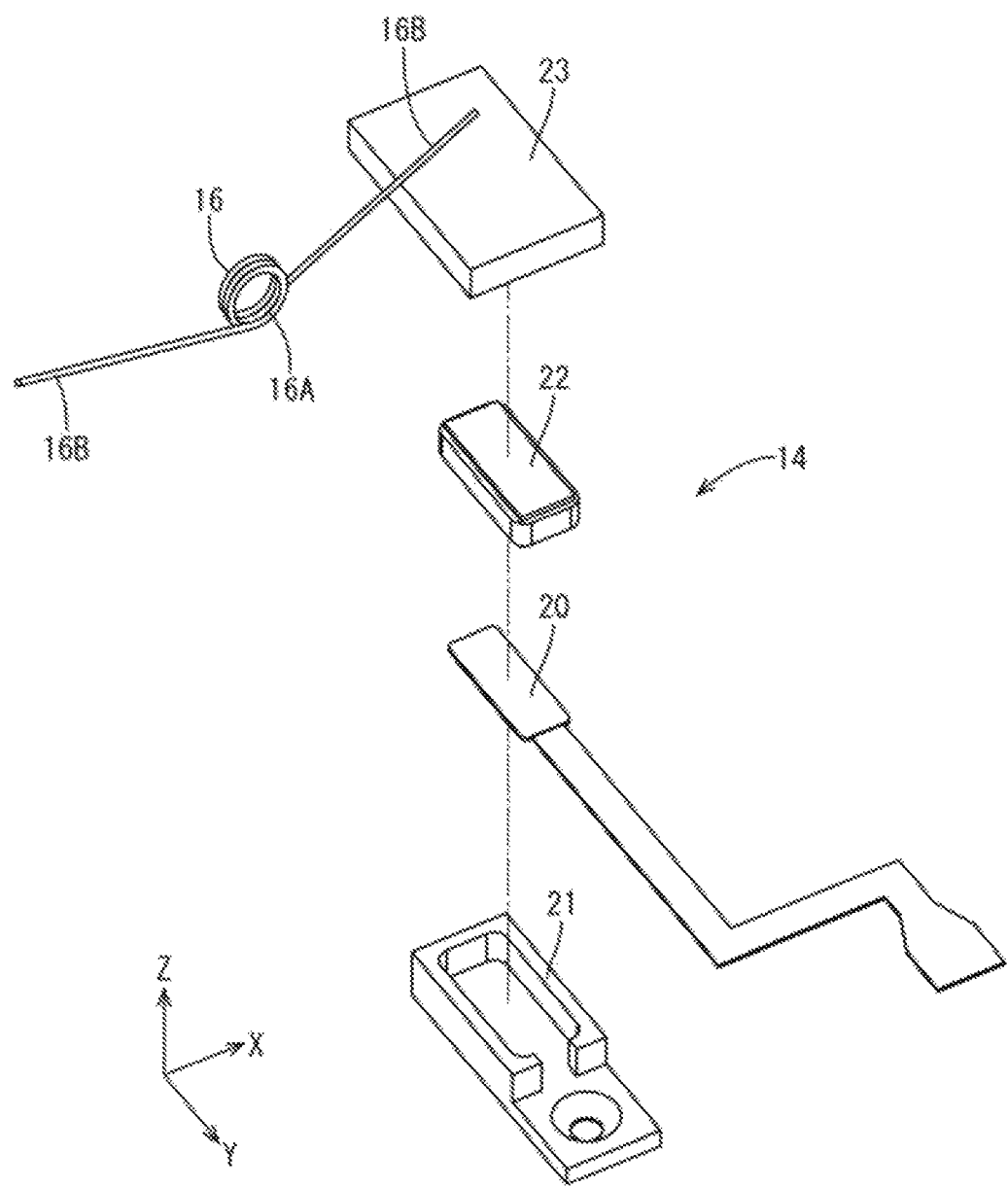
FIG. 4 is an exploded perspective view illustrating a first pressure sensor unit included in the input device.
Figure 5:
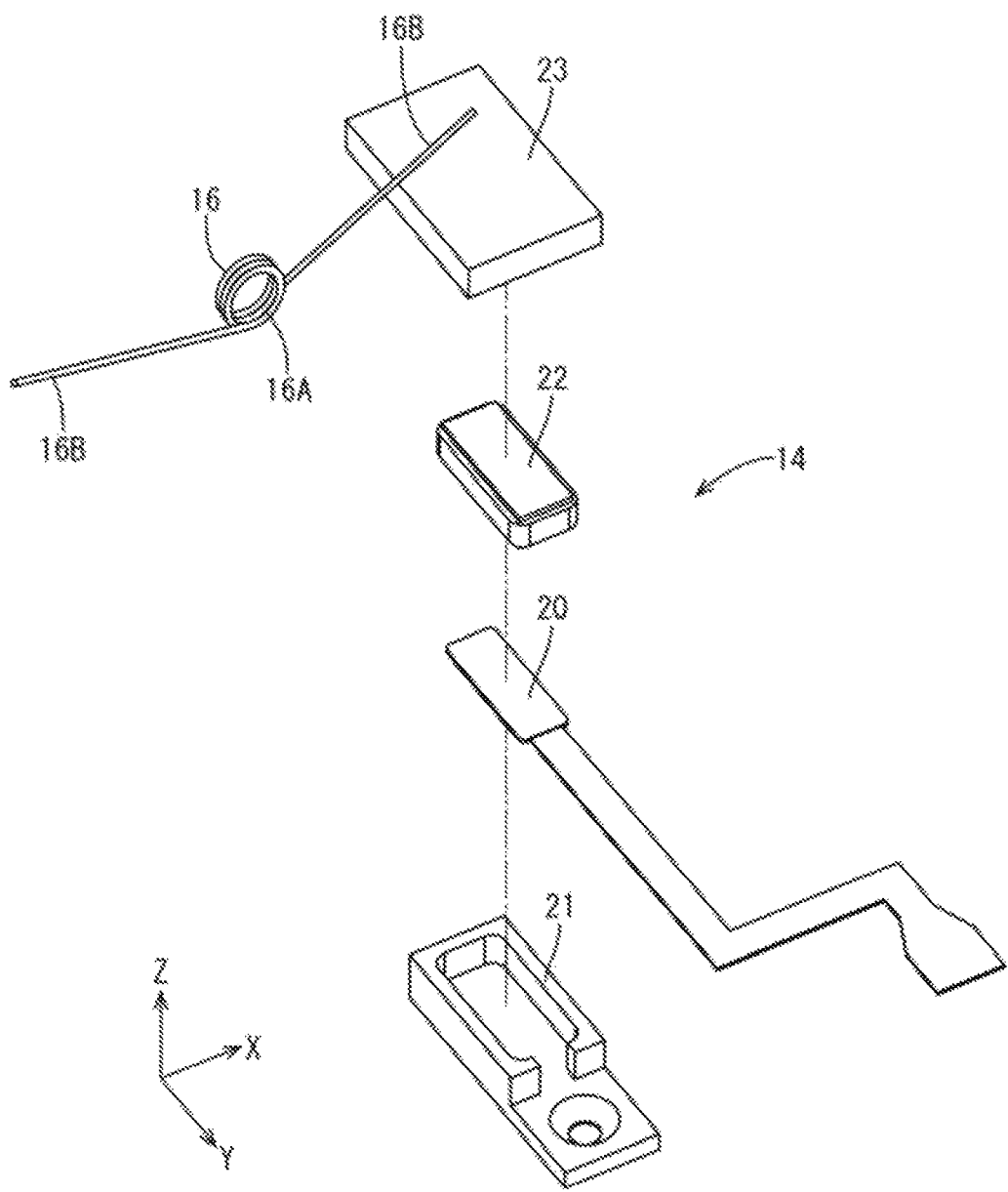
FIG. 5 is an exploded perspective view illustrating a second pressure sensor unit included in the input device.
Figure 6:
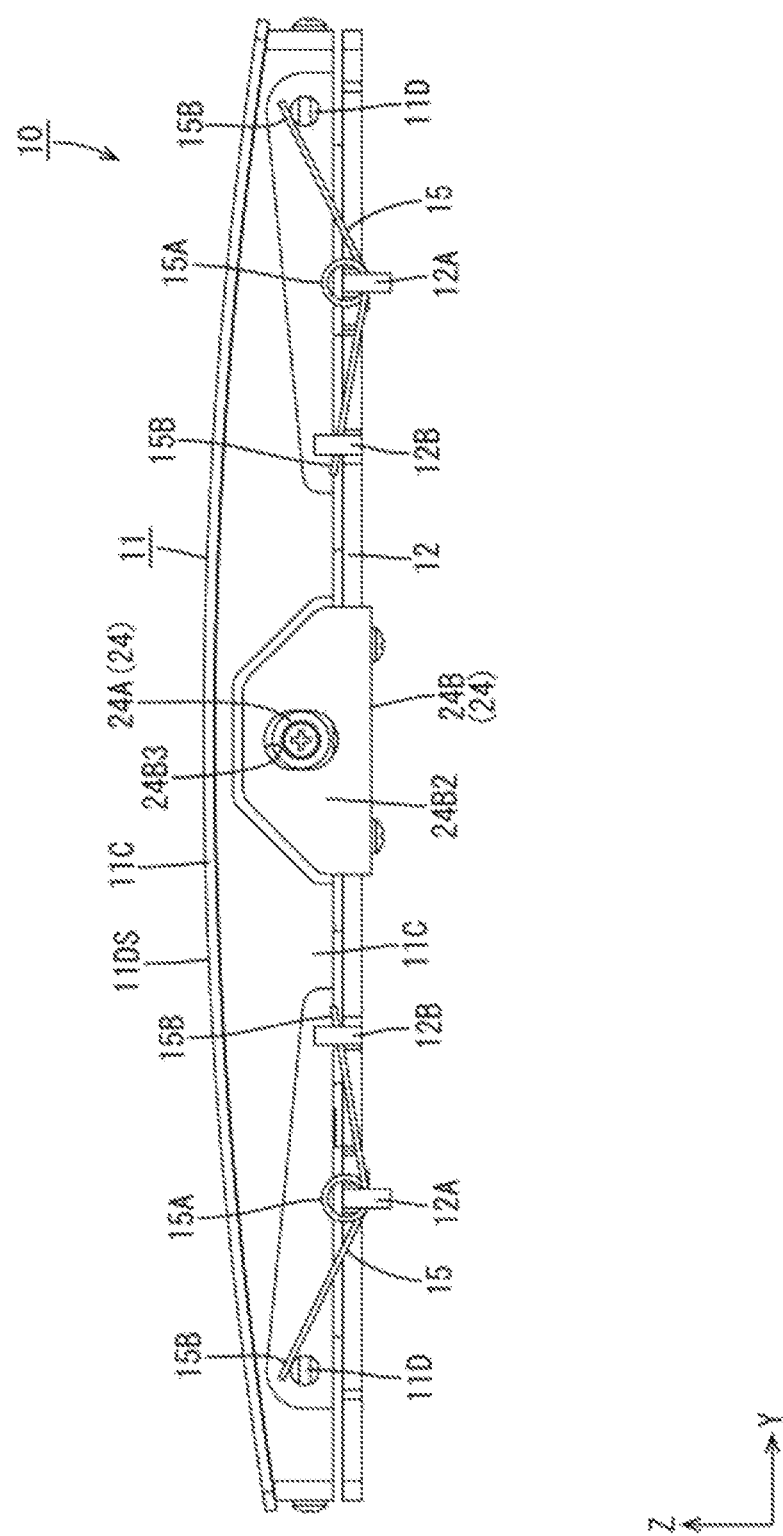
FIG. 6 is a front view illustrating the input device.
Figure 7:
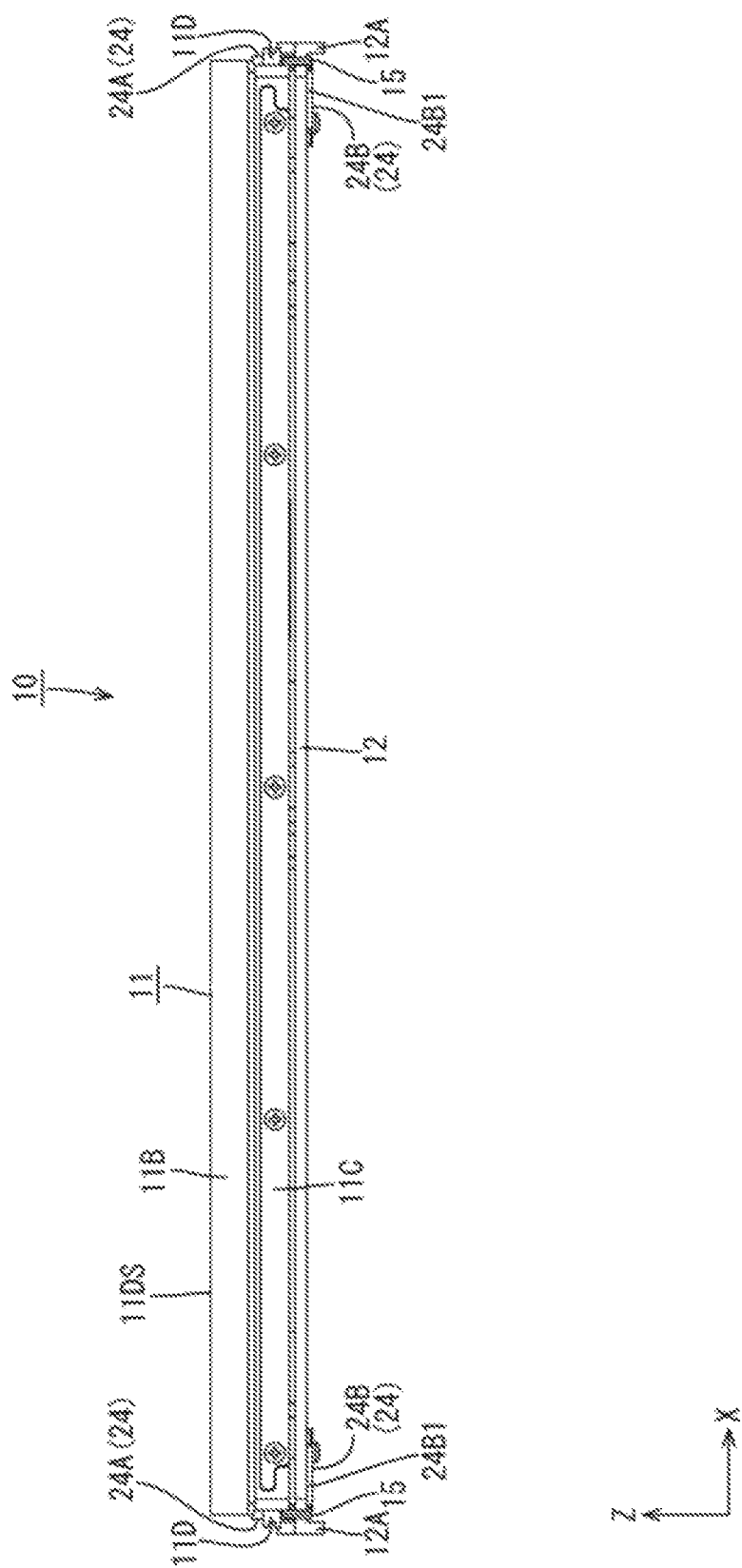
FIG. 7 is a side view illustrating the input device.

A first embodiment will be described with reference to FIG. 1 to FIG. 10. In this embodiment, an in-vehicle input device 10 is described. The X axis, the Y axis, and the Z axis are indicated in some of the drawings, and each of the axes indicates the same direction in the respective drawings. The vertical direction is based on FIG. 6 and FIG. 7. The upper side in FIG. 6 and FIG. 7 is a front side and the lower side in FIG. 6 and FIG. 7 is a rear side.

Figure 1:
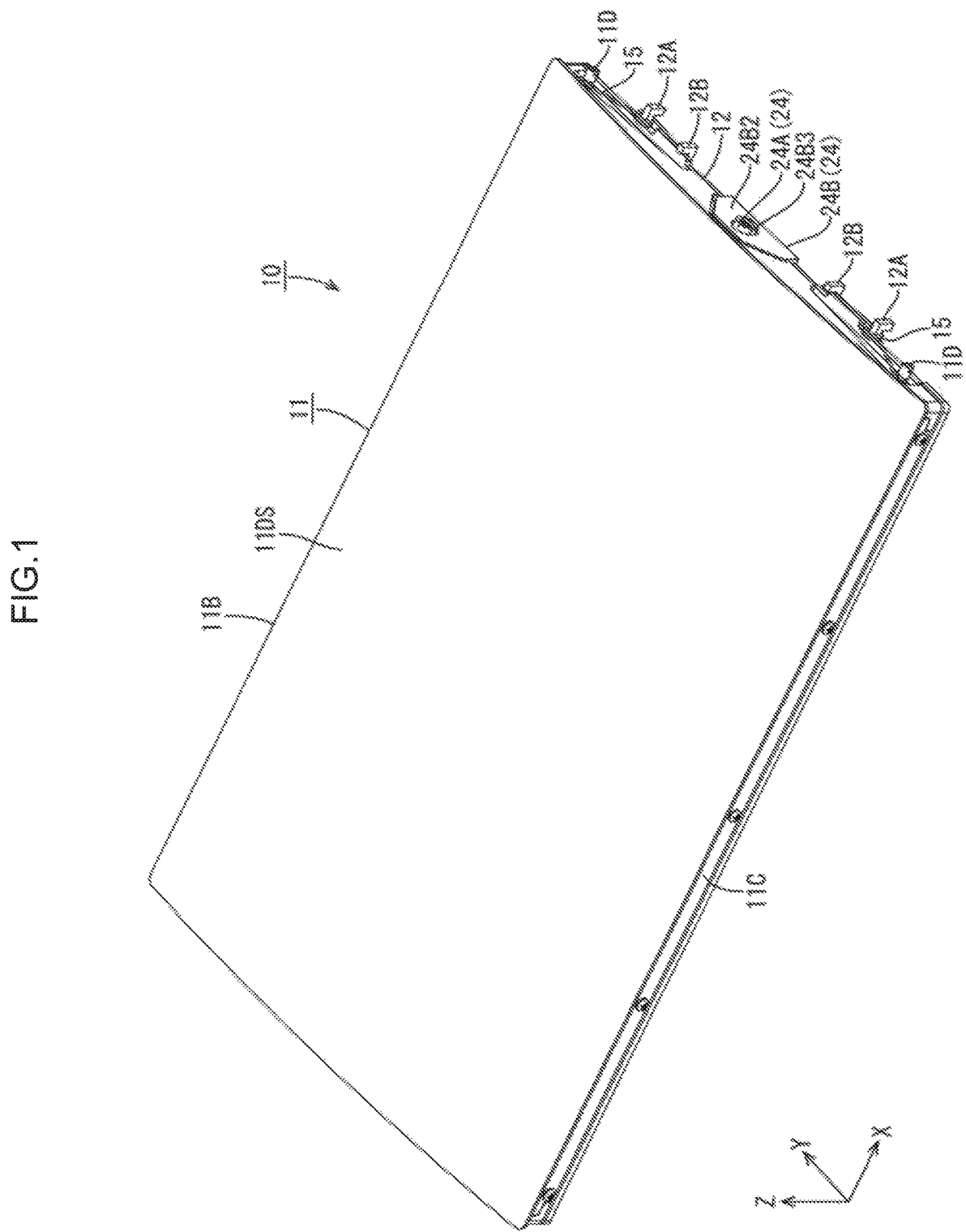
FIG. 1 is a perspective view illustrating an input device according to a first embodiment.

As illustrated in FIG. 1, the input device 10 at least includes a liquid crystal display device (input accepting member) 11, which displays an image and accepts a pressing operation (including a touch operation) by the user, and a base 12 to which the liquid crystal display device 11 is attached. The liquid crystal display device 11 has a touch panel function (position input function) to detect the position of input (pressed position, touched position) by the user, in addition to a display function of displaying an image. In this embodiment, although the input device 10 used in a car navigation system mounted in a passenger car is described as an example, the application of the input device 10 may be suitably changed.

Figure 2:
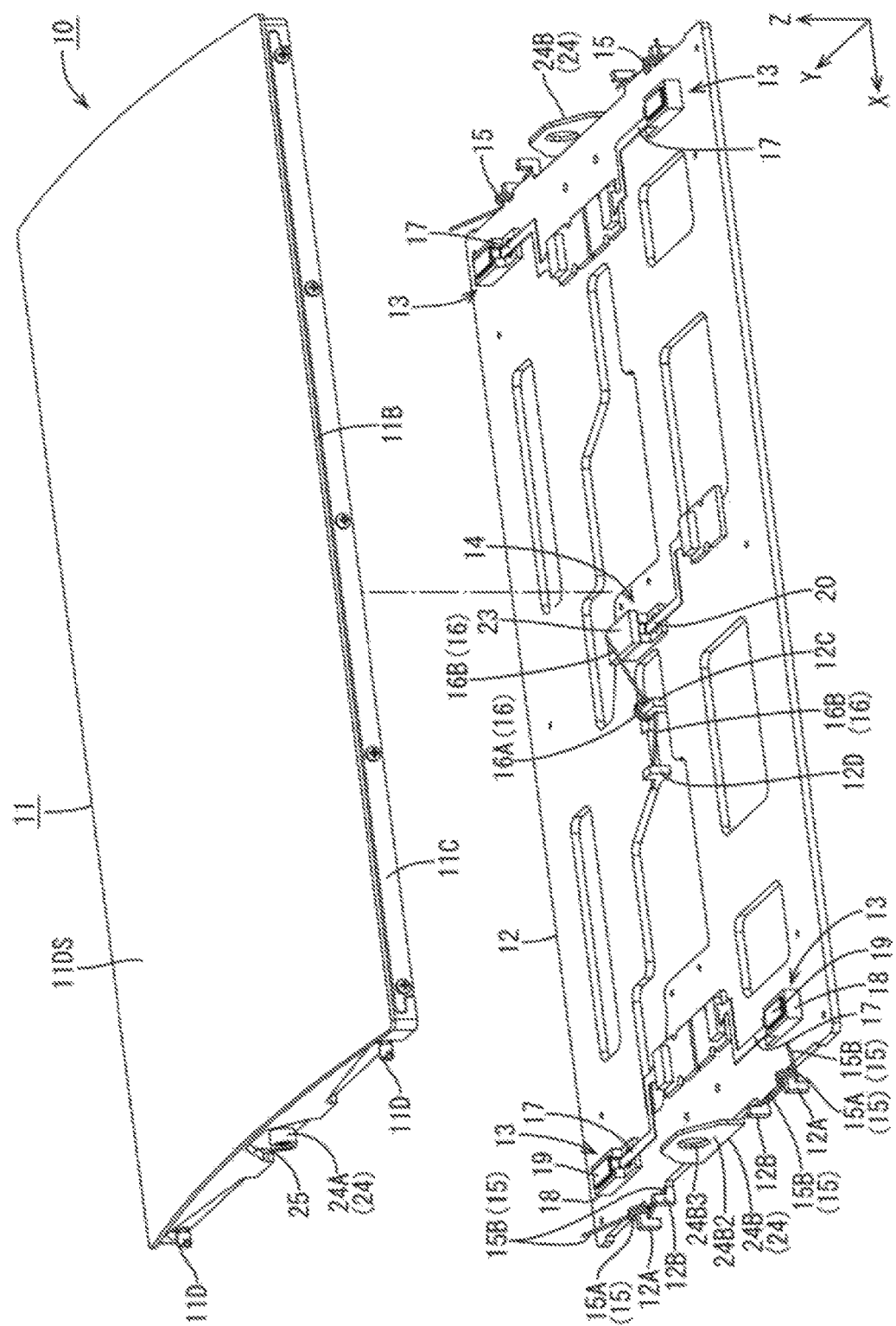
FIG. 2 is an exploded perspective view illustrating the input device.

As illustrated in FIG. 2, the liquid crystal display device 11 at least includes a liquid crystal panel (display panel) 11A, on which an image is displayed, a backlight device (not illustrated), which is disposed on the rear side of the liquid crystal panel 11A (side opposite a pressing operation accepting side) and configured to apply display light to the liquid crystal panel 11A, a cover glass (cover panel, panel protector) 11B, which covers the front surface of the liquid crystal panel 11A, and a housing 11C, which houses the liquid crystal panel 11A and the backlight device. The liquid crystal panel 11A at least includes two substantially transparent glass substrates (not illustrated) bonded to each other such that inner surfaces thereof face each other with a predetermined gap (cell gap) therebetween, a liquid crystal layer (not illustrated) sealed between the substrates, and two polarizing plates on outer surfaces of the substrates. On a CF substrate (counter substrate), which is one of the substrates on the front side, components such as an alignment film are disposed in addition to a color filter including coloring portions such as R (red), G (green), and B (blue) coloring portions disposed in a predetermined arrangement and a light blocking portion (black matrix) separating the adjacent coloring portions. On an array substrate (TFT substrate), which is one of the substrates on the rear side, components such as switching devices (TFTs, for example) connected to source lines and gate lines perpendicular to each other, pixel electrodes connected to the switching devices, and an alignment film are disposed.

Figure 3:
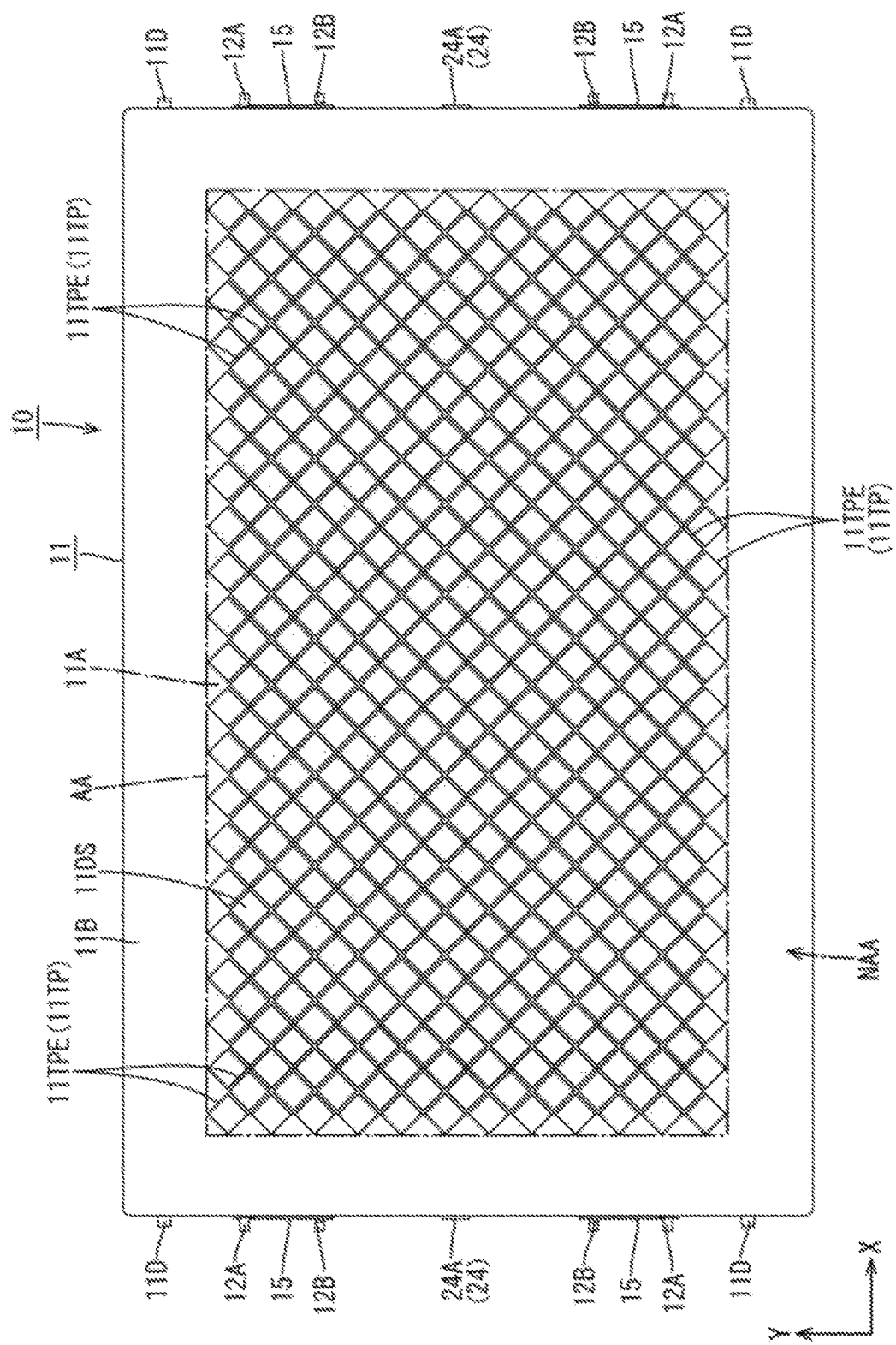
FIG. 3 is a plan view illustrating the input device.

As illustrated in FIG. 2 and FIG. 3, the liquid crystal panel 11A included in the liquid crystal display device 11 has a horizontally-long rectangular shape in a plan view, and the long-side direction, the short-side direction, and the direction normal to a display surface 11DS, respectively, match the X axis direction, the Y axis direction, and the Z axis direction in the drawings. The liquid crystal panel 11A has a curved display surface 11DS on which an image is displayed. Specifically described, the display surface 11DS protrudes to the front side at the middle portion in the long-side direction (X axis direction) and recedes to the rear side at the end portions in the long-side direction (outwardly warped shape, downwardly warped shape) to form an arc-like shape (C-like shape). The display surface 11DS curves about a curvature axis (not illustrated) extending in the long-side direction (X axis direction) on the rear side of the liquid crystal display device 11. Thus, the curve direction (direction in which a curvature changes) of the display device 11DS matches the long-side direction. The display surface 11DS of the liquid crystal panel 11A has a display area (active area) AA on which an image is displayed and a frame-like (frame-shaped) non-display area (non-active area) NAA surrounding the display area AA. In FIG. 3, a one-dot chain line indicates an outline of the display area AA and an area outside the one-dot chain line is the non-display area NAA.

Figure 8:
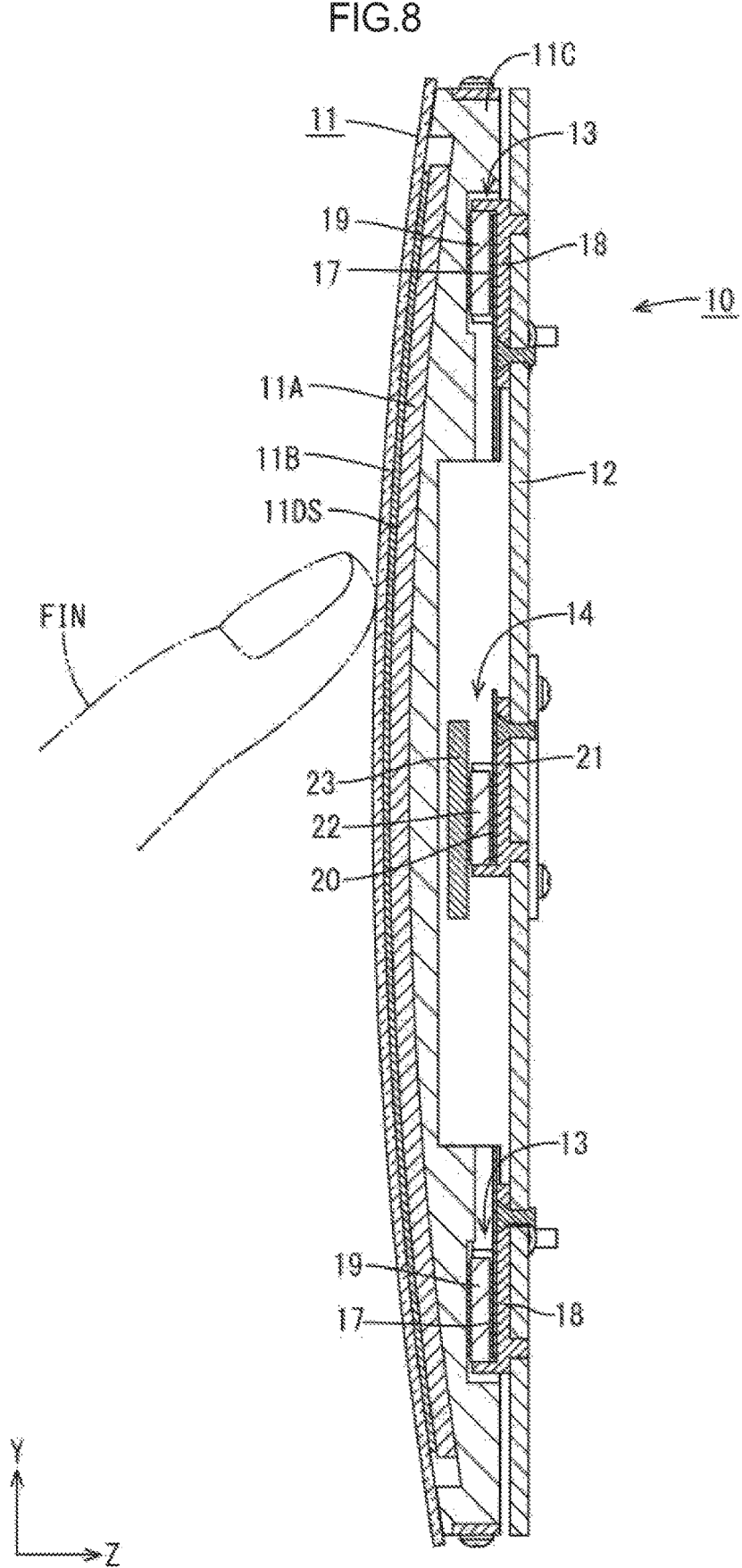
FIG. 8 is a cross-sectional view illustrating the first pressure sensor and the second pressure sensor included in the input device.
Figure 9:
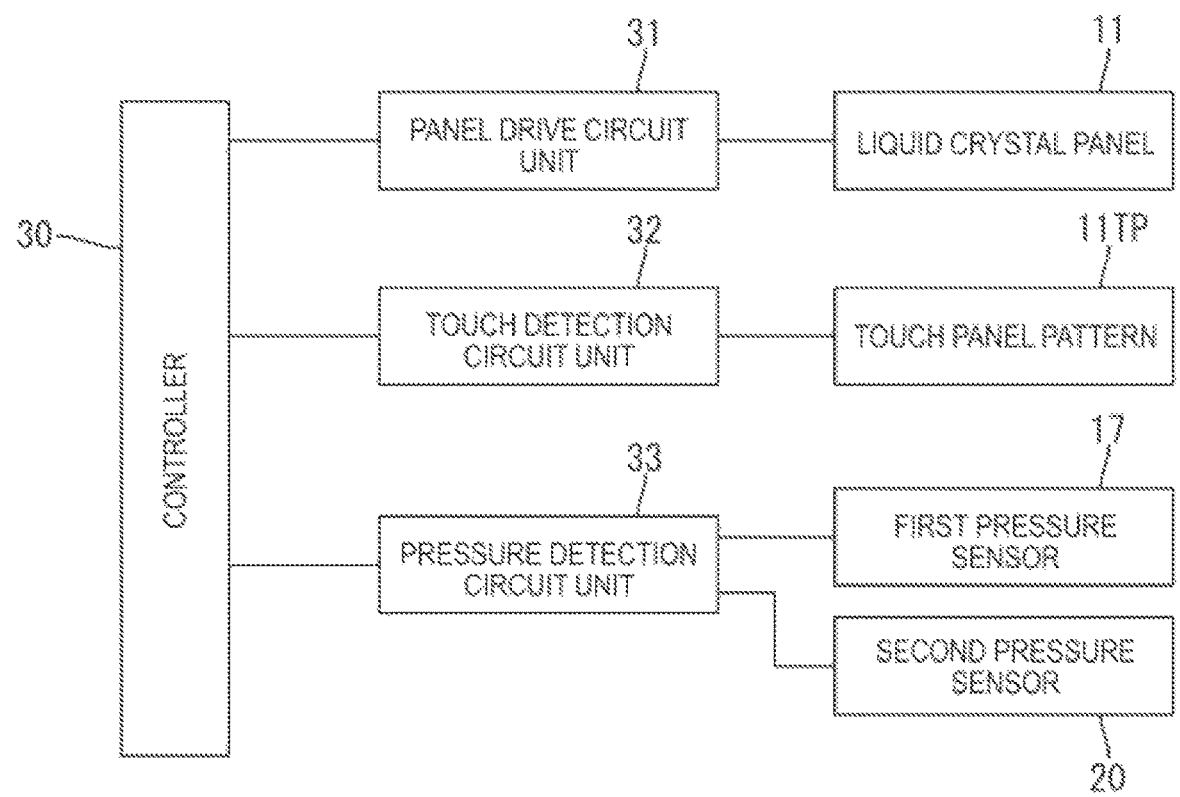
FIG. 9 is a block diagram indicating an electrical configuration of the input device.

As illustrated in FIG. 3, the liquid crystal panel 11A has a touch panel pattern (position detection pattern) 11TP configured to detect an input position that received the touch operation of the user. The touch panel pattern 11TP is a projected capacitive touch panel pattern and employs self-capacitive detection, for example. The touch panel pattern 11TP at least includes multiple touch electrodes (position detection electrodes) 11TPE arranged in a matrix over the display area AA. The display area AA of the liquid crystal panel 11A substantially corresponds to a touch area where input positions are detectable, and the non-display area NAA substantially corresponds to a non-touch area where input positions are undetectable. When the user performs a touch operation with a finger FIN (FIG. 8), which is an input body, based on the image displayed in the display area AA, a capacitance is formed between the finger FIN and the touch electrode 11TPE. The capacitance detected at the touch electrode 11TPE near the fin FIN changes as the finger FIN approaches, and the touch electrode 11TPE becomes distinguishable from the touch electrodes 11TPE away from the finger FIN, enabling the detection of the input position. Furthermore, a flexible board (not illustrated) connected to a control board (not illustrated) at one end is connected to the liquid crystal panel 11A at the other end. As illustrated in FIG. 9, the control board at least includes a panel driving circuit unit 31, which is configured to drive the liquid crystal panel 11A to display an image on the display surface 11DS, and a touch detection circuit unit 32, which is configured to drive the touch panel pattern 11TP to detect the input position that received the touch operation of the user.

As illustrated in FIG. 1, the cover glass 11B has a horizontally-long rectangular shape slightly larger than the liquid crystal panel 11A and covers the substantially entire area of the liquid crystal panel 11A from the front side to protect the liquid crystal panel 11A. The cover glass 11B curves along the display surface 11DS of the liquid crystal panel 11A. The cover glass 11B is a substantially transparent glass plate having high light transmitting properties and is preferably formed of strengthened glass. The strengthened glass that forms the cover glass 11B is preferably chemically strengthened glass including a chemically strengthened layer formed by a chemical strengthening treatment on the surface of the plate-like glass substrate, for example, but not limited thereto. The housing 11C has a box-like shape having a front opening and has a housing space in which the liquid crystal panel 11A and the backlight device are housed.

As illustrated in FIG. 2 and FIG. 3, the base 12 is formed of a plate having a horizontally-long rectangular shape in a plan view and is fixed to a fixing member (not illustrated) on a dashboard (not illustrated) of a passenger car. The base 12 has substantially the same size in plan view as the liquid crystal display device 11 and has attachment holes for attachment of various components in the plate surface, for example. The fixing member is unnecessary when the base 12 is directly fixed to the dashboard.

As illustrated in FIG. 2, at least first pressure sensor units 13, a second pressure sensor unit 14, first spring members 15, and a second spring member 16 are attached to the base 12 having the above-described configuration. The first pressure sensor unit 13 detects a pressure acting on the liquid crystal display device 11. The second pressure sensor unit 14, which is described in detail later, corrects the pressure detected by the first pressure sensor unit 13. The first spring member 15 elastically biases the liquid crystal display device 11 toward the first pressure sensor unit 13. The second spring member 16 elastically biases a portion of the second pressure sensor unit 14.

As illustrated in FIG. 2, the first pressure sensor units 13 and the second pressure sensor unit 14 are attached to the front surface of the base 12 and sandwiched between the liquid crystal display device 11 and the base 12 in the Z axis direction. Four first pressure sensor units 13 are disposed at the respective four corners of the liquid crystal display device 11 and the base 12. One second pressure sensor unit 14 is disposed at the middle of the liquid crystal display device 11 and the base 12. In other words, the second pressure sensor unit 14, which is located between the liquid crystal display device 11 and the base 12, is located inwardly from the four first pressure sensor units 13. As illustrated in FIG. 4, the first pressure sensor unit 13 includes a first pressure sensor (first pressure-sensitive sensor, first contact pressure sensor) 17 that detects a pressure, a first sensor holder 18 housing the first pressure sensor 17, and a first sensor cover 19 covering the first pressure sensor 17 from the front side. As illustrated in FIG. 8, the first pressure sensor 17 faces the rear surface of the liquid crystal display device 11 and is in contact or adjacent to the rear surface. FIG. 8 is a cross-sectional view illustrating the input device 10 mounted in an automobile. The up and down direction in FIG. 8 matches the vertical direction and the left-right direction in FIG. 8 matches the horizontal direction. With this configuration, the first pressure sensor 17 is able to detect a pressure from the liquid crystal display device 11. As illustrated in FIG. 5, the second pressure sensor unit 14 includes a second pressure sensor (second pressure-sensitive sensor, second contact pressure sensor) 20 that detects a pressure, a second sensor holder 21 housing the second pressure sensor 20, a second sensor cover 22 covering the second pressure sensor 20 from the front side, and a weight 23 disposed on the front side of the second pressure sensor 20. The weight 23 is larger than the second pressure sensor 20 in plan view but is smaller in size and in mass than the liquid crystal display device 11. As illustrated in FIG. 8, the weight 23 is located away from the rear surface of the liquid crystal display device 11 and is not in contact with the liquid crystal display device 11. The second pressure sensor 20 faces the rear surface of the weight 23 and is in contact with or adjacent to the rear surface. With this configuration, the second pressure sensor 20 is able to exclusively detect a pressure from the weight 23 and does not receive the pressure from the liquid crystal display device 11.

The first and second pressure sensors 17 and 20 are each a pressure sensor using a pressure sensitive ink. The first and second pressure sensors 17 and 20 each at least include two insulating films (not illustrated) attached to each other and pressure-sensitive electrodes (not illustrated) facing each other on the inner surfaces of the films. The first and second pressure sensors 17 and 20 use a change in the contact resistance value between the opposing pressure-sensitive electrodes, which changes according to the pressure applied to the first and second pressure sensors 17 and 20 in the thickness direction (Z axis direction), to detect the pressure. The pressure-sensitive electrode is formed by printing a pressure-sensitive ink on a film. As illustrated in FIG. 2, the first and second pressure sensors 17 and 20 each have a belt-like shape extending in the Y axis direction. The first end portions of the first and second pressure sensors 17 and 20 have a rectangular shape in a plan view and are housed in the first and second sensor holders 18 and 21, which are attached to the base 12, and the second end portions thereof are located outside the first and second sensor holders 18 and 21 and connected to the control board (not illustrated) via a coupling component (not illustrated). As indicated in FIG. 9, the control board at least includes a pressure detection circuit unit 33 configured to drive the first and second sensors 17 and 20 to detect the pressure applied to the liquid crystal display device 11 by the touch operation.

As illustrated in FIG. 2, the first and second spring members 15 and 16 are "torsion springs" (torsion coil springs) and each include a coil 15A or 16A and two arms 15B or 16B extending from the coil 15A or 16A. Two first spring members 15 are disposed on each short-side end of the liquid crystal display device 11 and the base 12, i.e., a total of four first spring members 15, such that the coils 15A are located at substantially the same positions in the Y axis direction as the four first pressure sensor units 13 and located at ends in the X axis direction. First coil holders 12A each holding the coil 15A of the first spring member 15 and first base-side arm holders 12B each holding one of the arms 15B of the first spring member 15 are disposed on the short-side ends of the base 12. As illustrated in FIG. 6 and FIG. 7, the first coil holders 12A and the first base-side arm holders 12B each protrude laterally from the end surface of the base 12 in the X axis direction and then extend in the Z axis direction to have an L-like cross-sectional shape. The portion of the first coil holder 12A protruding in the X axis direction is positioned in the coil 15A. The portion of the first base-side arm holder 12B protruding in the X axis direction supports the one of the arms 15B from the rear side. In contrast, first display-device-side arm holders 11D each holding the other of the arms 15B of the first spring member 15 are disposed at the short-side ends of the liquid crystal display device 11. The first display-device-side arm holders 11D each have a columnar shape protruding from the short-side outer surface of the liquid crystal display device 11 in the X axis direction and support the other of the arms 15B from the rear side. In this way, the liquid crystal display device 11 is elastically biased toward the base 12, because the one of the arms 15B of each of the first spring members 15 is supported by the first base-side arm holder 12B of the base 12 and the other of the arms 15B is supported by the first display-device-side arm holder 11D of the liquid crystal display device 11. The biasing force of the first spring member 15 allows the liquid crystal display device 11 to be in constant contact with the first pressure sensor 17 and allows a pressure to act on the first pressure sensor 17. This configuration is advantageous to eliminate a time lag between when the liquid crystal display device 11 accepts the pressing operation and when the first pressure sensor 17 detects the pressure.

As illustrated in FIG. 2, one second spring member 16 is attached to the middle portion of the liquid crystal display device 11 and the base 12 such that the coil 16A thereof is adjacent to the second pressure sensor unit 14 in the X axis direction. A second coil holder 12C holding the coil 16A of the second spring member 16 and a second base-side arm holder 12D holding one of the arms 16B of the second spring member 16 are disposed at the edge of the hole in the surface of the base 12. The second coil holder 12C and the second base-side arm holder 12D protrude from the edge of the hole in the base 12 in the Y axis direction and then extends in the Z axis direction to have an L-like cross-sectional shape. The portion of the second coil holder 12C protruding in the Y axis direction is located in the coil 16A. The portion of the second base-side arm holder 12D protruding in the Y axis direction supports the one of the arms 16B from the rear side. In this way, the weight 23 is elastically biased toward the base 12, because the one of the arms 16B of the second spring member 16 is supported by the second base-side arm holder 12D of the base 12 and the other of the arms 16B is supported by the weight 23 of the second pressure sensor unit 14 from the rear side. The biasing force of the second spring member 16 allows the weight 23 to be in constant contact with the second pressure sensor 20 and allows a pressure to act on the second pressure sensor 20. This configuration is advantageous to eliminate a time lag between when an inertial force is applied to the weight 23 and when the second pressure sensor 20 detects the pressure.

As indicated in FIG. 9, the input device 10 according to the embodiment includes a controller (processor) 30. The controller 30 is included in the control board (not illustrated) and is electrically connected to a panel driving circuit unit 31, a touch detection circuit unit 32, and a pressure detection circuit unit 33, which are included in the same control board, to control them. Specifically described, the controller 30 controls the panel driving circuit unit 31 to control an image displayed on the display surface 11DS of the liquid crystal panel 11A by the panel driving circuit unit 31. The controller 30 controls the touch detection circuit unit 32 to obtain information about the position of the pressing operation on the display surface 11DS with the finger FIN of the user. This enables the controller 30 to display an image corresponding to the input position of the pressing operation on the display surface 11DS of the liquid crystal panel 11A. The controller 30 controls the pressure detection circuit unit 33 to obtain the information about the pressures detected by the first and second pressure sensors 17 and 20 driven by the pressure detection circuit unit 33.

Then, the controller 30 corrects the output value from the first pressure sensor 17 by using the correction value obtained by multiplying the output value from the second pressure sensor 20 at least by the ratio of the mass of the liquid crystal display device 11 to that of the weight 23 to extract the output value relating to the pressing force applied to the liquid crystal display device 11 by the pressing operation. The correction process is performed to eliminate the influence of the inertial force, which acts on the input device 10 when the automobile is accelerated or deaccelerated, in the detection of the pressing force applied to the liquid crystal display device 11 by the pressing operation of the user. Specifically described, as illustrated in FIG. 8, when the liquid crystal display device 11 accepts the pressing operation of the user with the finger FIN, the pressure acting on the liquid crystal display device 11 is detected by the first pressure sensor 17. At this time, if the inertial force caused by acceleration or deceleration of the automobile acts on the input device 10, the inertial force acts on each of the liquid crystal display device 11 and the weight 23. In such a case, the pressure detected by the first pressure sensor 17 is the sum of the pressure caused by the pressing operation and the pressure caused by the inertial force acting on the liquid crystal display device 11, and the pressure detected by the second pressure sensor 20 is only the pressure caused by the inertial force acting on the weight 23. At this time, the controller 30 multiplies the output value from the second pressure sensor 20 by at least the ratio of the mass of the liquid crystal display device 11 to that of the weight 23 to obtain the correction value. The correction value corresponds to an amount of change in pressure acting on the first pressure sensor 17, which changes with an inertial force acting on the liquid crystal display device 11. The controller 30 corrects the output value from the first pressure sensor 17 by using the correction value to extract the output value relating to the pressing force applied to the liquid crystal display device 11 by the pressing operation. This processing operated by the controller 30 eliminates the change in pressure acting on the first pressure sensor 17, which is caused by the inertial force acting on the liquid crystal display device 11, enabling proper detection of the pressing force applied by the pressing operation. When an inertial force, which is generated by acceleration or deceleration of the automobile, is not applied to the input device 10 (for example, when the automobile is stopped), no inertial force acts on the liquid crystal display device 11 and the weight 23. Thus, the second pressure sensor 20 does not detect a pressure. In such a case, the output value from the second pressure sensor 20 is zero, and the correction value is also zero. Thus, the controller 30 extracts the output value from the first pressure sensor 17 as the output value relating to the pressing force applied to the liquid crystal display device 11 by the pressing operation.

Furthermore, the controller 30 multiplies the output value from the second pressure sensor 20 by the ratio of the spring constant of the first spring member 15 to that of the second spring member 16 in addition to the ratio of the mass of the liquid crystal display device 11 to that of the weight 23 to obtain the correction value. The correction value is calculated as above to eliminate the influence caused by the difference between the spring constant of the first spring member 15, which gives a spring force to the first pressure sensor 17, and the spring constant of the second spring member 16, which gives a spring force to the second pressure sensor 20. The correction value obtained as above properly reflects the difference between the spring constant of the first spring member 15 and that of the second spring member 16. The controller 30 is able to properly extract the output value relating to the pressing force applied to the liquid crystal display device 11 by the pressing operation by correcting the output value from the first pressure sensor 17 by using the correction value. Furthermore, the pressing force applied by the pressing operation is properly detected not only during deacceleration of the automobile but also during acceleration, because the liquid crystal display device 11 is elastically biased toward the first pressure sensor 17 by the spring force of the first spring member 15 and the weight 23 is elastically biased toward the second pressure sensor 20 by the spring force of the second spring member 16. Specifically described, when the automobile is deaccelerated, an inertial force toward the first and second pressure sensors 17 and 20 acts on the liquid crystal display device 11 and the weight 23. In such a case, the controller 30 subtracts the calculated correction value from the output value from the first pressure sensor 17 to extract the output value relating to the pressing force applied to the liquid crystal display device 11 by the pressing operation. In contrast, when the automobile is accelerated, the inertial force in a direction away from the first and second pressure sensors 17 and 20 acts on the liquid crystal display device 11 and the weight 23. In such a case, the controller 30 adds the calculated correction value to the output value from the first pressure sensor 17 to extract the output value relating to the pressing force applied to the liquid crystal display device 11 by the pressing operation.

Furthermore, as illustrated in FIG. 2 and FIG. 6, the liquid crystal display device 11 and the base 12 have recess-projection fitting structures 24 having recesses and projections fitting to each other. The recess-projection fitting structures 24 each include a display-device-side fitting 24A included in the liquid crystal display device 11 and a base-side fitting 24B attached to the base 12. The display-device-side fittings 24A have a substantially cylindrical shape and protrude outward from the respective short-side side surfaces of the housing 11C of the liquid crystal display device 11. The base-side fittings 24B are located at the middle of the respective short-side ends of the base 12. The base-side fittings 24B each include an attachment 24B1 attached to the rear surface of the base 12, an upright portion 24B2 extending frontward from the attachment 24B1, and a fitting recess 24B3, which is an opening in the upright portion 24B2. The display-device-side fitting 24A is inserted into the fitting recess 24B3. The fitting recess 24B3 has an oval shape. The long-axis direction of the fitting recess 24B3 matches the Z axis direction (pressing direction) and the short-axis direction thereof matches the Y axis direction (perpendicular direction). The fitting recess 24B3 has a dimension in the short-axis direction substantially equal to the diameter of the display-device-side fitting 24A and a dimension in the long-axis direction larger than the diameter of the display-device-side fitting 24A. This does not allow the display-device-side fitting 24A (liquid crystal display device 11) inserted into the fitting recess 24B3 to move relative to the base-side fitting 24B (base 12) in the Y axis direction, which is the short-side direction of the fitting recess 24B3, but allows the display device fitting 24A to move relative to the base-side fitting 24B in the Z axis direction, which is the long-axis direction of the fitting recess 24B3. This configuration allows the liquid crystal display device 11 to be moved relative to the base 12 in the Z axis direction by the pressing operation or the inertial force. Furthermore, the liquid crystal display device 11 has a cutout 25 receiving the upright portion 24B2 of the base-side fitting 24B in the outer side surface having the display-device-side fitting 24A. The cutout 25 has a face facing the upright portion 24B2 with a predetermined space therebetween. This configuration enables the liquid crystal display device 11 to move relative to the base-side fitting 24B (base 12) in the X axis direction.

Figure 10:
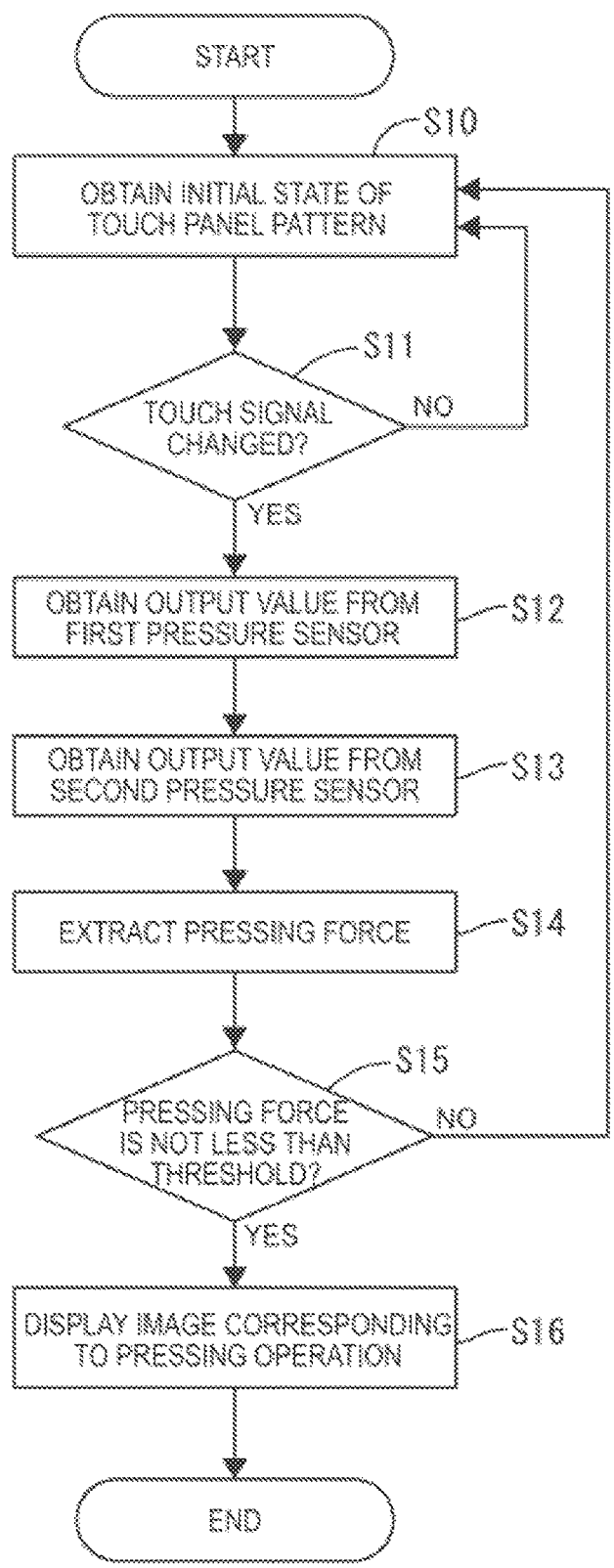
FIG. 10 is a flowchart indicating a process of extracting an output value relating to a pressing force applied to the liquid crystal display device by a pressing operation.

The present embodiment has the above-described structure, and the operation of the embodiment is described next. First, as indicated in FIG. 10, the controller 30 obtains an initial state of the touch panel pattern 11TP through the touch detection circuit unit 32 (step S10) and determines whether the touch signal changed through the touch detection circuit unit 32 (step S11). When the touch signal did not change, the controller 30 determines that neither of the non-pressing touch operation and the pressing operation was performed, and the process returns to the step S10. In this way, when the input position was not detected by the touch panel pattern 11TP, the controller 30 does not obtain an output value from the first and second pressure sensors 17 and 20. In contrast, when the touch signal changed, the controller 30 obtains a position information relating to the input position of the touch operation or the pressing operation and obtains the output value from the first pressure sensors 17 through the pressure detection circuit unit 33 (step S12). The total output value, which is the sum of the output values from the first pressure sensors 17, is the value reflecting the pressing force applied to the liquid crystal display device 11 by the pressing operation, the inertial force applied to the liquid crystal display device 11 by acceleration or deacceleration of the automobile, and a spring force applied to the liquid crystal display device 11 by the first spring member 15. Then, the controller 30 obtains the output value from the second pressure sensor 20 (step S13). The output value from the second pressure sensor 20 is the value reflecting an inertial force applied to the weight 23 by acceleration or deacceleration of the automobile and a spring force acting on the weight 23 from the second spring member. In this way, when the input position was detected by the touch panel pattern 11TP, the controller 30 obtains the output values from the first and second pressure sensors 17 and 20.

Then, as indicated in FIG. 10, the controller 30 extracts the output value relating to the pressing force, which is applied to the liquid crystal display device 11 by the pressing operation, by using the output values from the first and second pressure sensors 17 and 20 (step S14). In this processing, the controller 30 multiplies the output value from the second pressure sensor 20 by the ratio of the mass of the liquid crystal display device 11 to that of the weight 23 and by the ratio of the spring constant of the first spring member 15 to that of the second spring member 16 to obtain the correction value. The value obtained by multiplying the output value from the second pressure sensor 20 by the ratio of the mass of the liquid crystal display device 11 to that of the weight 23 corresponds to the amount of change in pressure acting on the first pressure sensors 17, which changes with an inertial force acting on the liquid crystal display device 11. Furthermore, the value obtained by multiplying the output value from the second pressure sensor 20 by the ratio of the spring constant of the first spring member 15 to that of the second spring member 16 corresponds to the amount of change in pressure acting on the first pressure sensor 17, which changes with a spring force acting thereon from the first spring member 15. Thus, the correction value calculated by the processor 30 is the value reflecting the inertial force applied to the liquid crystal display device 11 by acceleration or deacceleration of the automobile and the spring force acting on the liquid crystal display device 11 from the first spring member 15.

Here, when the automobile is deaccelerated, an inertial force toward the first and second pressure sensors 17 and 20 acts on the liquid crystal display device 11 and the weight 23. Thus, the output value from the second pressure sensor 20 becomes larger than the initial value with or without the pressing operation. In view of this, when the output value from the second pressure sensor 20 is larger than the initial value, the controller 30 subtracts the correction value calculated as above from the total output value, which is the sum of the output values from the first pressure sensors 17. In this way, the output value relating to the pressing force applied to the liquid crystal display device 11 by the pressing operation is extracted without being affected by the inertial force applied to the liquid crystal display device 11 by the deacceleration of the automobile and the spring force acting on the liquid crystal display device 11 from the first spring member 15. In contrast, when the automobile is accelerated, an inertial force in a direction away from the first and second pressure sensors 17 and 20 is applied to the liquid crystal display device 11 and the weight 23. Thus, the output value from the second pressure sensor 20 becomes smaller than the initial value with or without the pressing operation. In view of this, when the output value from the second pressure sensor 20 is smaller than the initial value, the controller 30 adds the correction value calculated as above to the total output value, which is the sum of the output values from the first pressure sensors 17. In this way, the output value relating to the pressing force applied to the liquid crystal display device 11 by the pressing operation is extracted without being affected by the inertial force applied to the liquid crystal display device 11 by the acceleration of the automobile and the spring force acting on the liquid crystal display device 11 from the first spring member 15. In this way, the pressing force applied to the liquid crystal display device 11 by the pressing operation is properly detected.

After the output value relating to the pressing force applied to the liquid crystal display device 11 by the pressing operation is obtained as described above, the controller 30 determines whether the output value relating to the pressing force is not less than the threshold (step S15). The threshold is a criterion for determining whether the pressing operation was performed. Specifically described, when the output value relating to the pressing force does not exceed the threshold, the controller 30 determines that the pressing operation was not performed, but the touch operation was performed. In contrast, when the output value relating to the pressing force exceeds the threshold, the controller 30 determines that the pressing force was performed and changes an image displayed on the display surface 11DS (step S16). The image displayed on the display surface 11DS by the controller 30 at this time corresponds to the pressing operation. Thus, the user can know whether the pressing operation was performed by seeing the image on the display surface 11DS.

As described above, the input device 10 according to the present embodiment includes the liquid crystal display device (input accepting member) 11 that accepts the pressing operation, the base 12 to which the liquid crystal display device 11 is attached, the first pressure sensor 17 disposed on the base 12 and configured to detect the pressure from the liquid crystal display device 11, the weight 23, the second pressure sensor 20 disposed on the base 12 and configured to detect the pressure from the weight 23, and the controller (processor) 30 configured to correct the output value from the first pressure sensor 17 by using the correction value obtained by multiplying the output value from the second pressure sensor 20 by at least the ratio of the mass of the liquid crystal display device 11 to that of the weight 23 to extract an output value relating to a pressing force applied to the liquid crystal display device 11 by the pressing operation.

In this configuration, when the liquid crystal display device 11 accepts the pressing operation, the first pressure sensor 17 detects the pressure acting on the liquid crystal display device 11. At this time, when no inertial force acts on the input device 10, the second pressure sensor 20 does not detect a pressure because no inertial force acts on the liquid crystal display device 11 and the weight 23. In such a case, the output value from the second pressure sensor 20 is zero, and the correction value is zero. Thus, the controller 30 extracts the output value from the first pressure sensor 17 as the output value relating to the pressing force applied to the liquid crystal display device 11 by the pressing operation. In contrast, when an inertial force acts on the input device 10, the first pressure sensor 17 detects the pressure including the pressure caused by the inertial force and the pressure caused by the pressing operation and the second pressure sensor 20 detects the pressure caused by the inertial force, because the inertial force acts on each of the liquid crystal display device 11 and the weight 23. At this time, the controller 30 calculates the correction value by multiplying the output value from the second pressure sensor 20 by at least the ratio of the mass of the liquid crystal display device 11 to that of the weight 23. The correction value corresponds to an amount of change in pressure acting on the first pressure sensor 17, which changes with an inertial force acting on the liquid crystal display device 11. The controller 30 corrects the output value from the first pressure sensor 17 by using the correction value to extract the output value relating to the pressing force applied to the liquid crystal display device 11 by the pressing operation. This processing performed by the controller 30 eliminates a change in pressure acting on the first pressure sensor 17, which is caused by an inertial force acting on the liquid crystal display device 11, enabling proper detection of the pressing operation.

Furthermore, the first spring member 15, which elastically biases the liquid crystal display device 11 toward the first pressure sensor 17, and the second spring member 16, which elastically biases the weight 23 toward the second pressure sensor 20, are included. In this configuration, the liquid crystal display device 11 is elastically biased by the first spring member 15 toward the first pressure sensor 17, allowing a pressure to constantly act on the first pressure sensor 17 from the liquid crystal display device 11. This configuration is advantageous to eliminate a time lag between when the liquid crystal display device 11 accepts the pressing operation and when the first pressure sensor 17 detects the pressure. Similarly, the weight 23 is elastically biased by the second spring member 16 toward the second pressure sensor 20, allowing a pressure to constantly act on the second pressure sensor 20 from the weight 23. This configuration is advantageous to eliminate a time lag between when inertia is applied to the weight 23 and when the second pressure sensor 20 detects the pressure. When an inertial force in a direction toward the first and second pressure sensors 17 and 20 acts on the liquid crystal display device 11 and the weight 23, the controller 30 subtracts the calculated correction value from the output value from the first pressure sensor 17 to extract the output value relating to the pressing force applied to the liquid crystal display device 11 by the pressing operation. In contrast, when an inertial force in a direction away from the first and second pressure sensors 17 and 20 acts on the liquid crystal display device 11 and the weight 23, the controller 30 adds the calculated correction value to the output value from the first pressure sensor 17 to extract the output value relating to the pressing force applied to the liquid crystal display device 11 by the pressing operation.

Furthermore, the controller 30 obtains the correction value by multiplying the output value from the second pressure sensor 20 by the ratio of the spring constant of the first spring member 15 to that of the second spring member 16, in addition to the ratio of the mass of the liquid crystal display device 11 to that of the weight 23. The first pressure sensor 17 detects a spring force acting on the liquid crystal display device 11 from the first spring member 15 as a pressure. The second pressure sensor 20 detects a spring force acting on the weight 23 from the second spring member 16 as a pressure. If the spring constant of the first spring member 15 is different from that of the second spring member 16, it is preferred that the difference in the spring constant be taken into consideration when the controller 30 calculates the correction value. Under such a circumstance, the controller 30 calculates the correction value by multiplying the output value from the second pressure sensor 20 by the ratio of the spring constant of the first spring member 15 to that of the second spring member 16, in addition to the ratio of mass of the liquid crystal display device 11 to that of the weight 23. The correction value obtained in this way corresponds to an amount of change in pressure acting on the first pressure sensor 17, which changes with the spring force acting thereon from the first spring member 15. Thus, the controller 30 is able to properly extract the output value relating to the pressing force applied to the liquid crystal display device 11 by the pressing operation by correcting the output value from the first pressure sensor 17 by using the correction value.

Furthermore, the liquid crystal display device 11 further includes the liquid crystal panel (display panel) 11A having the display surface 11DS on which an image is displayed, as an input accepting surface that accepts the pressing operation and the touch operation without pressing, and the touch panel pattern 11TP configured to detect an input position of the display device 11DS that received the pressing operation or the touch operation. In this configuration, when the display surface 11DS, which is the input accepting surface, is pressed or touched based on the image displayed on the display surface 11DS of the liquid crystal panel 11A, the position of input is detected by the touch panel pattern 11TP.

Furthermore, the controller 30 determines whether the input position is detected by the touch panel pattern 11TP, and only when the input position is detected, the controller 30 obtains the output values from the first and second pressure sensors 17 and 20. If the input position is not detected by the touch panel pattern 11TP, the controller 30 does not obtain the output values from the first and second pressure sensors 17 and 20. In contrast, when the input position is detected by the touch panel pattern 11TP, the controller 30 extracts the output values from the first and second pressure sensors 17 and 20 and extracts the output value relating to the pressing force applied to the liquid crystal display device 11 by the pressing operation.

Furthermore, the controller 30 determines that the pressing operation was performed only when the output value relating to the pressing force exceeds a threshold for determining whether the pressing operation was performed, and changes an image displayed on the display surface 11DS. When the output value relating to the pressing force does not exceed the threshold, the controller 30 determines that the touch operation was performed but the pressing operation was not performed. In contrast, when the output value relating to the pressing force exceeds the threshold, the controller 30 determines that the pressing operation was performed and changes an image displayed on the display surface 11DS. Thus, the user can know whether the pressing operation was performed by seeing the image on the display surface 11DS.

Furthermore, the multiple first pressure sensors 17 are dispersedly disposed. The controller 30 corrects the total output value, which is the sum of the output values from the first pressure sensors 17, by using the correction value to extract the output value relating to the pressing force. This configuration enables more proper detection of the pressure acting on the liquid crystal display device 11 by the dispersedly-located first pressure sensors 17. The controller 30 properly extracts the output value relating to the pressing force applied to the liquid crystal display device 11 by the pressing operation, even when an inertial force acts on the input device, by correcting the total output value, which is the sum of the output values from the first pressure sensors 17, by using the calculated correction value.

Furthermore, the liquid crystal display device 11 has a rectangular shape in a plan view. The first pressure sensors 17 are located at the respective four corners of the liquid crystal display device 11 and the second pressure sensor 20 is located inwardly from the first pressure sensors 17 on the liquid crystal display device 11. In this configuration, the first pressure sensors 17, which are located at the respective four corners of the rectangular liquid crystal display device 11, properly detect the pressure applied to any position of the liquid crystal display device 11 by the pressing operation. The second pressure sensor 20 does not block the detection of the pressure by the first pressure sensors 17 because the second pressure sensor 20 is located on the liquid crystal display device 11 at a position inwardly from the first pressure sensors 17, which are located at the four corners of the liquid crystal display device 11.

Furthermore, the weight 23 is located away from the liquid crystal display device 11 and is not in contact with the liquid crystal display device 11. With this configuration, the inertial force acting on the liquid crystal display device 11 is unlikely to act on the second pressure sensor 20 through the weight 23.

Second Embodiment

Figure 11:
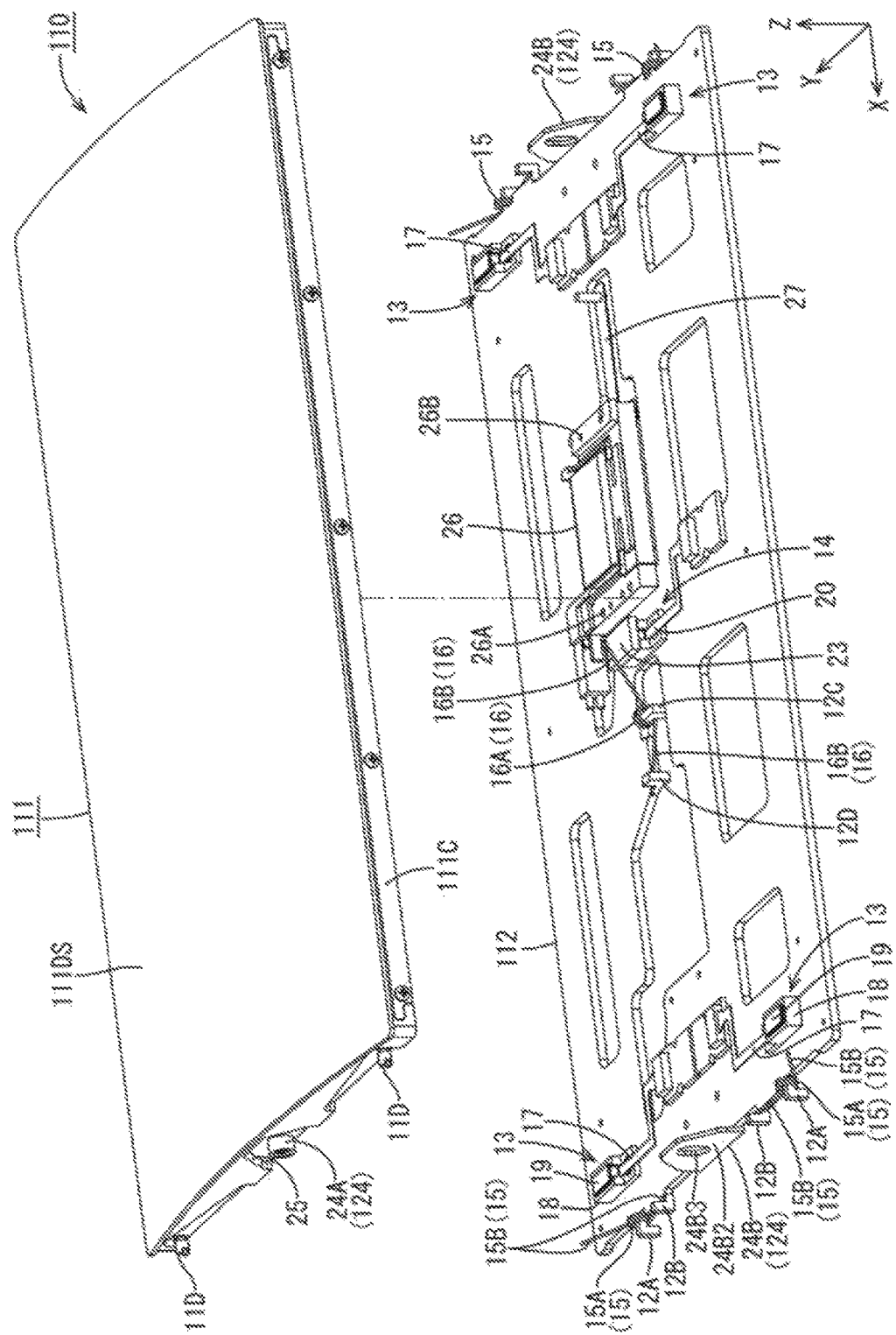
FIG. 11 is an exploded perspective view illustrating an input device according to a second embodiment.
Figure 12:
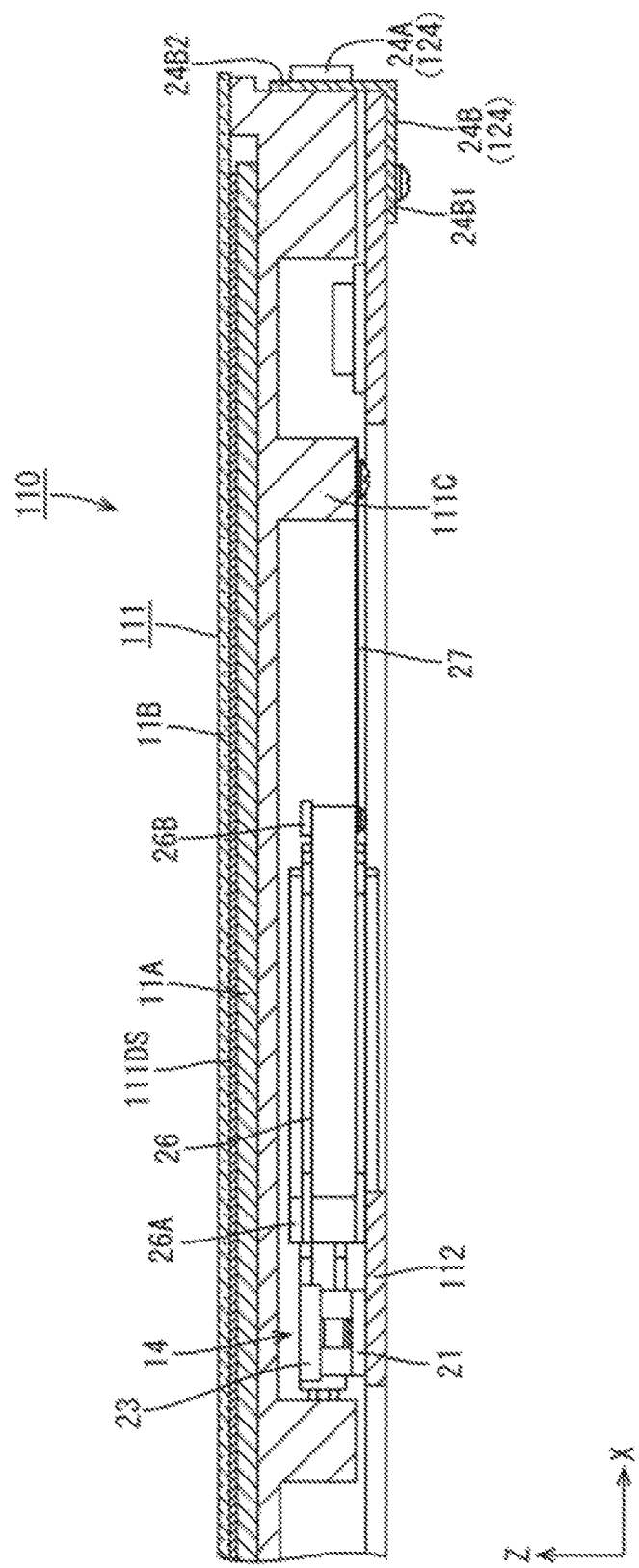
FIG. 12 is a cross-sectional view illustrating a portion of the input device including an actuator.

A second embodiment is described with reference to FIG. 11 or FIG. 12. The second embodiment further includes an actuator 26. The same components, effects, and advantages as those in the first embodiment are not repeatedly described.

In this embodiment, an input device 110 has a haptic feedback function (touch-sense feedback function). As illustrated in FIG. 11, the actuator 26 configured to vibrate the liquid crystal display device 111 is attached to a base 112 in the embodiment. As illustrated in FIG. 11 and FIG. 12, the actuator 26 is an "electromagnetic actuator" (solenoid actuator) and includes a fixing portion 26A, which is attached to the base 112, and a movable portion 26B, which is attached to the liquid crystal display device 111 and movable relative to the fixing portion 26A in the X axis direction (vibration direction). The fixing portion 26A at least includes a fixed magnetic pole (not illustrated) and a coil (not illustrated) wound around the fixed magnetic pole. The movable portion 26B at least includes a movable magnetic pole (not illustrated) movable relative to the fixed magnetic pole. In the actuator 26, when electrical current flows through the coil, a magnetic field is generated at the fixed magnetic pole and the movable magnetic pole is attracted by the magnetic field, allowing the movable portion 26B to move toward the fixed portion 26A in the X axis direction. This configuration enables the liquid crystal display device 111, to which the movable portion 26B is attached, to vibrate in the X axis direction (direction perpendicular to the pressing direction of the pressing operation) relative to the base 112 to which the fixing portion 26A is attached. The fixing portion 26A of the actuator 26 is fixed to the base 112 with a screw. The movable portion 26B of the actuator 26 is fixed to a leaf spring 27 extending in the X axis direction with a screw. The leaf spring 27 is formed of a metal (stainless steel, for example) flat plate and has a plate surface parallel to a display surface 111DS of the liquid crystal display device 111 and the plate surface of the base 112. The leaf spring 27 is elastically deformable in the Z axis direction (pressing direction), which is the direction normal to the plate surface thereof. The leaf spring 27 is fixed to the movable portion 26B at one end in the X axis direction with a screw and to a housing 111C of the liquid crystal display device 111 at the other end with a screw. Thus, the one end fixed to the movable portion 26B functions as a fulcrum that allows the leaf spring 27 to elastically deform in a cantilever shape and the other end is able to move in the Z axis direction in accordance with the elastic deformation. Since the liquid crystal display device 111 is fixed to the other end of the leaf spring 27, the liquid crystal display device 111 is moved in the Z axis direction when the leaf spring 27 is elastically deformed.

In the input device 110 including the actuator 26, only when the controller (not illustrated in this embodiment), for example, determines that the pressing force applied to the liquid crystal display device 111 by the pressing operation is not less than the threshold, the controller activates the actuator 26. With this configuration, the vibration is transmitted from the liquid crystal display device 111, which is vibrated by the actuator 26 in the X axis direction, to the finger of the user, simulating the sensation of pressing down an imaginary button on the display surface 111DS in the Z axis direction due to lateral force field phenomenon. The sensation enables the user to clearly recognize that the pressing operation was correctly performed. Furthermore, as illustrated in FIG. 11, recess-projection fitting structures 124 allow the liquid crystal display device 111 to move in the X axis direction (vibration direction) and the Z axis direction (pressing direction) relative to the base 112 but do not allow the liquid crystal display device 111 to move in the Y axis direction (direction perpendicular to both the pressing direction and the vibration direction) relative to the base 112. With this configuration, the liquid crystal display device 111 is unlikely to be displaced in the Y axis direction relative to the base 112 by vibration of the actuator 26, for example.

As described above, this embodiment includes the actuator 26 configured to vibrate the liquid crystal display device 111 in the direction perpendicular to the pressing direction of the pressing operation. In this configuration, the actuator 26 is vibrated when the liquid crystal display device 111 accepts the pressing operation, causing the liquid crystal display device 111 to vibrate relative to the base 112 in the direction perpendicular to the pressing direction, and the vibration is transmitted to the user who performed the pressing operation. This gives the user a sensation of pressing down in the pressing direction.

Furthermore, the liquid crystal display device 111 and the base 112 have the recess-projection fitting structures 124 having recesses and projections fitting to each other. The recess-projection fitting structures 124 allow the liquid crystal display device 111 to move relative to the base 112 in the pressing direction and the vibration direction of the actuator 26 but do not allow the liquid crystal display device 111 to move relative to the base 112 in the perpendicular direction perpendicular to both the pressing direction and the vibration direction. In this configuration, when the actuator 26 is vibrated, the recess-projection structures 124 allow the liquid crystal display device 111 to move relative to the base 112 in the vibration direction. When the liquid crystal display device 111 accepts the pressing operation, the recess-projection structures 124 allow the liquid crystal display device 111 to move relative to the base 112 in the pressing direction. Furthermore, since the recess-projection structures 124 do not allow the liquid crystal display device 111 to move relative to the base 112 in the perpendicular direction perpendicular to both the pressing direction and the vibration direction of the actuator 26, the liquid crystal display device 111 is unlikely to be displaced relative to the base 112 in the perpendicular direction by the vibration of the actuator 26, for example.

Third Embodiment

A third embodiment is described with reference to FIG. 13. The third embodiment further includes determination regarding the correction value, in addition to the steps in the first embodiment. The same components, effects, and advantages as those in the first embodiment are not repeatedly described.

Figure 13:
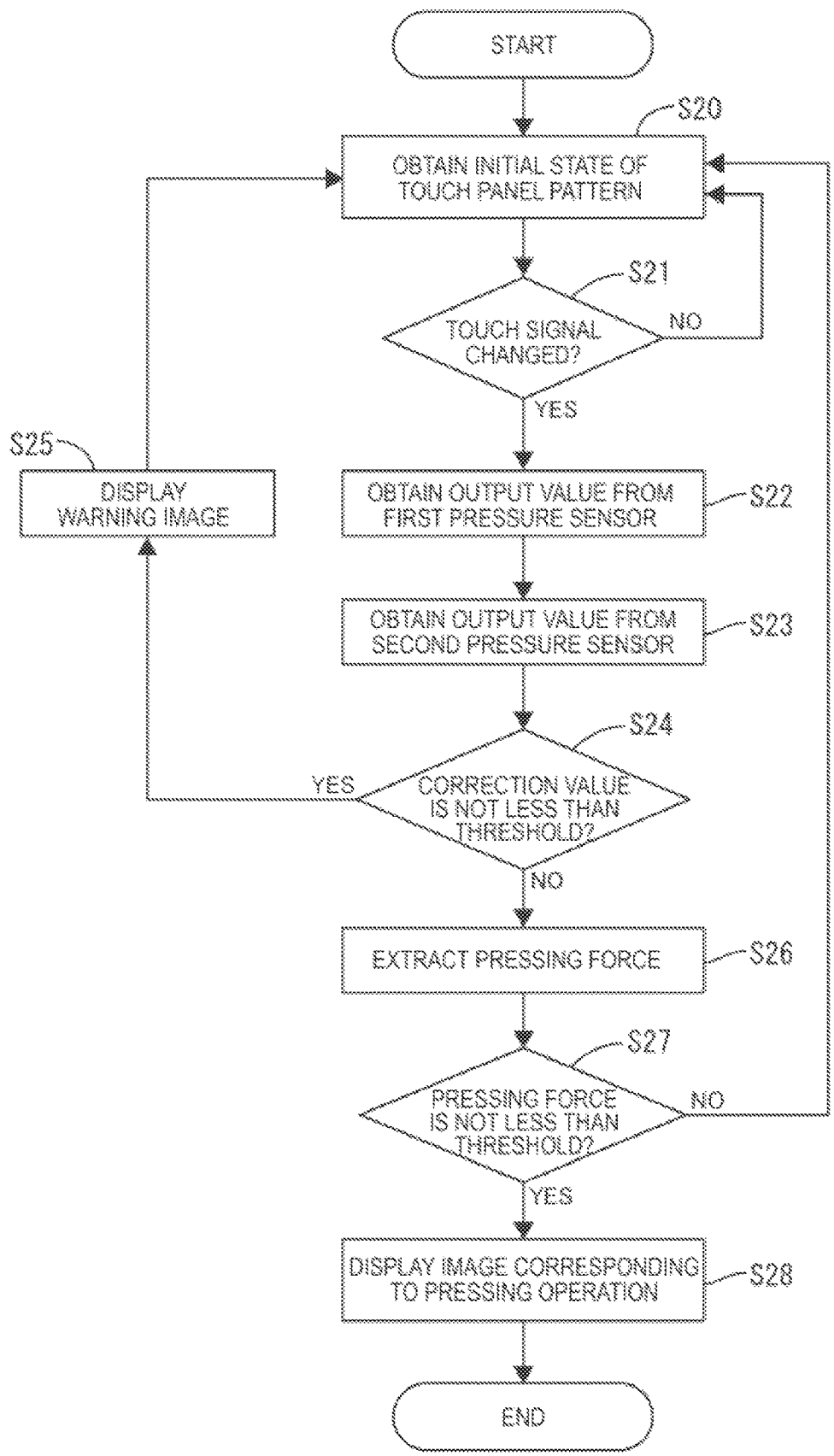
FIG. 13 is a flow chart indicating a process of extracting an output value relating to a pressing force applied to a liquid crystal display device by a pressing operation, according to a third embodiment.

As indicated in FIG. 13, the controller according to this embodiment obtains the output value from the second pressure sensor (step S23), and then determines whether the correction value obtained by using the output value from the second pressure sensor is not less than the threshold (step S24). Since the correction value calculated by the controller reflects the inertial force acting on the input device, the threshold is the criterion for determining whether to give a warning that the inertial force acting on the input device is too large (excessive). Specifically described, when the correction value does not exceed the threshold, the controller determines that the inertial force acting on the input device is within the acceptable range and corrects the output value from the first pressure sensor by using the correction value to extract the output value relating to the pressing force applied to the liquid crystal display device by the pressing operation (step S26). In contrast, when the correction value exceeds the threshold, the controller determines that the inertial force acting on the input device is too large and displays a warning image on the display surface (step S25). This enables the user to know that the inertial force is excessive by seeing the warning image on the display surface. The steps S20 to S23 in FIG. 13 are the same as the steps S10 to S13 in FIG. 10 of the first embodiment. The steps S26 to S28 in FIG. 13 are the same as the steps S14 to S16 in FIG. 10 of the first embodiment.

As described above, in this embodiment, the controller determines that the inertial force acting on the input device is excessive only when the correction value exceeds the threshold, and displays a warning image on the display surface. In this configuration, when the correction value does not exceed the threshold, which is a criterion for giving a warning, the controller determines that the inertial force acting on the input device is within the allowable range and corrects the output value from the first pressure sensor by using the correction value to extract the output value relating to the pressing force applied to the liquid crystal display device by the pressing operation. In contrast, when the correction value exceeds the threshold, which is a criterion for giving a warning, the controller determines that the inertial force acting on the input device is excessive and displays a warning image on the display surface. This enables the user to know that the inertial force is excessive by seeing the warning image on the display surface.

OTHER EMBODIMENTS

The technology described herein is not limited to the embodiments described above and with reference to the drawing. The following embodiments may be included in the technical scope.

(1) In the above embodiments, the relationship between the output value from the first pressure sensor and the pressure acting on the first pressure sensor is a linear function. However, if the relationship between the output value from the first pressure sensor and the pressure acting on the first pressure sensor is not a linear function, a data table for converting the output value from the first pressure sensor is provided, for example. The output value from the first pressure sensor is converted into a converted output value based on the data table. The correction value is subtracted from the converted output value or the correction value is added to the converted output value to calculate an output value relating to the pressing force.

(2) In the above embodiments, the controller obtains the correction value by multiplying the output value from the second pressure sensor by the ratio of the spring constant of the first spring member to that of the second spring member. However, when the spring constant of the first spring member and that of the second spring member are the same, the multiplication of the spring constant ratio may be eliminated.

(3) In the above embodiments, the first spring member and the second spring member are formed of the same material. However, the first spring member and the second spring member may be formed of different materials. In such a case, the controller preferably calculates the correction value by multiplying the output value from the second pressure sensor by the ratio of elastic constant of the first spring member to that of the second spring member.

(4) In the above embodiments, the first and second spring members are torsion springs. However, a different type of spring from the torsion spring may be used as the first and second spring members.

(5) The above embodiments include the first spring member and the second spring member. However, the first and second spring members may be eliminated.

(6) The positions of the first pressure sensors on the base and the number of first pressure sensors may be suitably changed from those in the above embodiments. For example, the first pressure sensors may be located on the base at positions other than the four corners. Furthermore, the number of first pressure sensors may be three or less or five or more.

(7) The position of the second pressure sensor on the base and the number of second pressure sensors may be suitably changed from those in the embodiments. For example, the second pressure sensor may be located away from the center of the base in the X axis direction or the Y axis direction. Furthermore, the number of second pressure sensors may be two or more.

(8) In the above embodiments, the weight is not in contact with the liquid crystal display device. However, a spacer such as a buffer may be disposed between the weight and the liquid crystal display device. In such a case, the material of the spacer is preferably selected such that the inertial force or the pressing force acting on the liquid crystal display device is hardly transmitted to the weight through the spacer.

(9) In the above embodiments, the display surface and the cover glass of the liquid crystal panel curve about a curvature axis extending in the X axis direction. However, the display surface and the cover glass of the liquid crystal panel may curve about a curvature axis extending in the Y axis direction.

(10) In the above embodiments, the display surface and the cover glass of the liquid crystal panel each curve such that the middle portion protrudes to the front side and the end portions recedes to the rear side. However, the display surface and the cover glass of the liquid crystal panel may curve such that the end portions protrude to the front side and the middle portion recedes to the rear side.

(11) In the above embodiments, the liquid crystal panel has the curved display surface and the curved cover glass. However, the display surface and the cover glass of the liquid crystal panel may be flat without curving.

(12) In the above embodiments, the cover glass is disposed on the display surface of the liquid crystal panel. However, the cover glass may be eliminated.

(13) In the above embodiments, the pressure sensor using a pressure-sensitive ink is described as an example. However, a different type of pressure sensor such as a pressure sensor using a piezoelectric element may be used.

(14) In the second embodiment, the configuration including only one actuator is described as an example. However, the number of actuators may be two or more.

(15) In the second embodiment, the actuator is an electromagnetic actuator. However, the actuator may be an inertial drive actuator such as a piezoelectric actuator and a linear actuator. In such a case, the inertial drive actuator is not disposed on the base and is disposed only on the liquid crystal display device.

(16) The second embodiment and the third embodiment may be combined.

(17) In the above embodiments, the touch panel pattern is an in-cell touch panel pattern, which is built in a liquid crystal panel. However, the touch panel pattern may be an out-cell touch panel pattern, which is located on the front surface of the liquid crystal panel.

(18) In the above embodiments, the self-capacitive touch panel pattern is described as an example. However, the touch panel pattern may be a mutual capacitance touch panel pattern. Furthermore, the shape in a plan view of the touch electrodes constituting the touch panel pattern is not limited to a rhombus and may be a rectangle, a circle, or a polygon having five or more sides.

(19) In the above embodiments, the liquid crystal display device including a touch panel pattern is described as an example. However, the liquid crystal display device not including the touch panel pattern may be used.

(20) In the above embodiments, the input device (liquid crystal display device and the base) has a horizontally-elongated rectangular shape in a plan view. However, the shape in a plan view of the input display device may be a vertically-elongated rectangle, a square, an oval, an ellipse, a circle, a trapezoid, or a partly curved shape, for example.

(21) The specific application of the input device, for example, is not limited to the above embodiments and may be suitably changed.

(22) In the above embodiments, the liquid crystal display device including a liquid crystal panel is described as an example. However, the display device may include another type of display panel, such as a plasma display panel (PDP), an organic EL panel, or a microcapsule electrophoretic display panel (EPD), or a micro electro mechanical system (MEMS) display panel.

The invention claimed is:

1. An input device comprising:
    an input accepting member that accepts a pressing operation;
    a base to which the input accepting member is attached;
    a first pressure sensor disposed on the base and configured to detect a pressure acting thereon by the input accepting member;
    a weight;
    a second pressure sensor disposed on the base and configured to detect a pressure acting thereon by the weight; and
    a processor configured to: calculate a correction value by multiplying an output value from the second pressure sensor by at least a ratio of mass of the input accepting member to that of the weight; and correct an output value from the first pressure sensor by using the correction value to extract an output value relating to a pressing force applied to the input accepting member by the pressing operation.

2. The input device according to claim 1, further comprising:
    a first spring member that elastically biases the input accepting member toward the first pressure sensor; and
    a second spring member that elastically biases the weight toward the second pressure sensor.

3. The input device according to claim 2, wherein the processor is configured to multiply the output value from the second pressure sensor by a ratio of a spring constant of the first spring member to that of the second spring member, in addition to the ratio of mass of the input accepting member to that of the weight, to obtain the correction value.

4. The input device according to claim 1, wherein the input accepting member includes a display panel having a display surface, on which an image is displayed, as an input accepting surface configured to receive the pressing operation and a touch operation without pressing; and
    a touch panel pattern configured to detect an input position in the display surface that received the pressing operation or the touch operation.

5. The input device according to claim 4, wherein the processor is configured to determine, only when the input position was detected, whether the input position was detected by the touch panel pattern and obtain the output values from the first pressure sensor and the second pressure sensor.

6. The input device according to claim 4, wherein the processor is configured to determine that the pressing operation was performed only when the output value relating to the pressing force exceeds a threshold for determining whether the pressing operation was performed, and change an image displayed on the display surface.

7. The input device according to claim 4, wherein the processor is configured to determine that an inertial force acting on the input device is excessive, only when the correction value exceeds a threshold, and display a warning image on the display surface.

8. The input device according to claim 1, wherein the first pressure sensor includes a plurality of first pressure sensors located at dispersed positions, and
    the processor is configured to correct a total output value that is the sum of output values from the plurality of first pressure sensors by using the correction value to extract the output value relating to the pressing force.

9. The input device according to claim 8, wherein the input accepting member has a rectangular shape in a plan view, and the plurality of first pressure sensors are located at respective four corners of the input accepting member and the second pressure sensor is located inwardly from the plurality of first pressure sensors on the input accepting member.

10. The input device according to claim 1, wherein the weight is located away from the input accepting member and is not in contact with the input accepting member.

11. The input device according to claim 1, further comprising an actuator configured to vibrate the input accepting member in a direction perpendicular to a pressing direction of the pressing operation.

12. The input device according to claim 11, wherein the input accepting member and the base have a recess-projection fitting structure having a recess and a projection fitting to each other, and
    the recess-projection fitting structure allows the input accepting member to move relative to the base in the pressing direction and a vibration direction of the actuator and does not allow the input accepting member to move relative to the base in a perpendicular direction perpendicular to both the pressing direction and the vibration direction.

\* \* \* \* \*